US 6,430,612 B1

(12) United States Patent
Iizuka

(10) Patent No.: US 6,430,612 B1
(45) Date of Patent: Aug. 6, 2002

(54) NETWORK DEVICE MANAGEMENT APPARATUS AND METHOD, AND STORAGE MEDIUM

(75) Inventor: Yoshio Iizuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,820

(22) Filed: Mar. 29, 1999

(30) Foreign Application Priority Data

Mar. 31, 1998 (JP) .......................................... 10-087647

(51) Int. Cl.[7] .............................................. G06F 13/00
(52) U.S. Cl. ........................ 709/223; 709/220; 709/250; 709/328
(58) Field of Search ................................ 709/217, 218, 709/219, 220, 221, 223, 224, 250, 328

(56) References Cited

U.S. PATENT DOCUMENTS

| 5,696,894 | A |   | 12/1997 | Ono ............................. 395/114 |
| 5,734,642 | A | * | 3/1998  | Vaishnavi et al. ........... 370/255 |
| 5,832,503 | A | * | 11/1998 | Malik et al. ................. 707/104 |
| 5,887,139 | A | * | 3/1999  | Madison, Jr. et al. ....... 709/223 |
| 5,935,217 | A | * | 8/1999  | Sakai et al. ................. 709/249 |
| 6,029,198 | A |   | 2/2000  | Iizuka |
| 6,054,987 | A | * | 4/2000  | Richardson ................. 345/348 |
| 6,122,639 | A | * | 9/2000  | Babu et al. .................. 707/103 |
| 6,240,457 | B1 | * | 5/2001 | Bell ............................. 709/230 |
| 6,269,398 | B1 | * | 7/2001 | Leong et al. ................ 709/224 |
| 6,295,527 | B1 | * | 9/2001 | McCormack et al. .......... 707/3 |

OTHER PUBLICATIONS

Patent Abstracts of Japan, vol. 1998, No. 2, (JP 09–258927), Oct. 3, 1997.

"Non–Deterministic Dynamic Query for Job Re–Direction Mechanism", IBM Technical Disclosure Bulletin, US, IBM Corp., New York, vol. 38, No. 7, Jul. 1, 1995, p 329.

"Method for Combining Variable and Fixed Print Data in a Print Image", IBM Technical Disclosure Bulletin, US, IBM Corp., New York, vol. 36, No. 10, Oct. 1, 1993, pp. 239–240.

Hayes, F., "The Printers Talk Back", Byte, US, McGraw–Hill, Inc., vol. 18, No. 13, Dec. 1, 1993, pp. 103–104, 106, 108, 110.

* cited by examiner

Primary Examiner—Viet D. Vu
(74) Attorney, Agent, or Firm—Fitzpatrick, Cella, Harper & Scinto

(57) ABSTRACT

Based on identification data specifying the type of network device, a device subjected to monitoring and controlling is searched. If the device cannot be specified, a device group to which the device belongs is specified based on the identification data. In a case where a subjected network device cannot be specified but the device belongs to a predetermined device group, detail data is displayed on a display window for the device group.

39 Claims, 11 Drawing Sheets

NETWORK DEVICE MANAGEMENT APPARATUS AND METHOD, AND STORAGE MEDIUM

BACKGROUND OF THE INVENTION

The present invention relates to management apparatus and method of a network device which monitors or controls various devices connected to a network, and a storage medium.

Lately, a Local Area Network (LAN) interconnecting computers is widely used. A local area network can be constructed on a floor of the same building, or in an entire building, or in a group of buildings (on a private network), or in an area, or a larger area. Such local area networks are further interconnected, and can be connected to a worldwide network. These interconnected LANs employ various hardware interconnection techniques and have a number of network protocols. A user can change devices, install software, or diagnose problems.

Under such circumstance, if a user of a personal computer (PC) wishes to monitor, in depth, the state of a device, such as a printer, which is connected via a network, the network device management method and apparatus must have, in advance, a device detail window corresponding to the monitored device.

Various types of devices are connected to the network. Device detail windows of some of these devices are not held in advance by the network device management method and apparatus. In such case, the conventional network device management method and apparatus are unable to display device detail data.

SUMMARY OF THE INVENTION

The present invention is made in consideration of the above situation, and has as its object to provide a network device management apparatus and method which enable displaying device data by using a device detail window for a corresponding device group, in a case where the type of device is unknown but the device belongs to a predetermined device group.

In order to attain the above objects, according to the present invention, the network device management apparatus, management method, and storage medium storing programs for executing the management method by a computer have the following configuration.

More specifically, the present invention provides a network device management apparatus for monitoring or controlling a device connected through a network, comprising: specifying means for specifying a type of network device; and group specifying means for specifying a device group to which the network device belongs in a case where the type of network device is not specified by the specifying means.

According to an aspect of the present invention, the network device management apparatus further comprises: acquisition means for acquiring data related to the network device; and display control means for displaying the data related to the network device on display means.

According to an aspect of the network device management apparatus of the present invention, the display control means displays the data related to the network device in a format for each type of the network device, or in a format for each device group.

According to an aspect of the network device management apparatus of the present invention, the display control means notifies the fact of display impossibility in a case where a device group cannot be specified.

According to an aspect of the present invention, the network device management apparatus further comprises: first designation means for designating a network device to be monitored; and second designation means for designating a data item related to the network device designated by the first designation means, wherein the display control means displays data for the designated item related to the designated network device.

According to an aspect of the network device management apparatus of the present invention, the second designation means is capable of designating a state sheet for displaying data related to a state of a network device, or a job sheet for displaying information related to a printer queue, or a management sheet for displaying manager information, or a network sheet for displaying information related to a network protocol.

According to an aspect of the present invention, the network device management apparatus further comprises identification data acquisition means for acquiring identification data which specifies a type of network device, wherein the specifying means specifies the type of network device based on the identification data.

According to an aspect of the network device management apparatus of the present invention, the group specifying means specifies the device group to which the network device belongs based on the identification data.

According to an aspect of the network device management apparatus of the present invention, the identification data is MIB (Management Information Base) data.

According to an aspect of the network device management apparatus of the present invention, the device group comprises plural types of network devices.

According to an aspect of the network device management apparatus of the present invention, the type of network device specifies a device on the network.

According to an aspect of the network device management apparatus of the present invention, the network device includes a printer.

According to an aspect of the network device management apparatus of the present invention, the network device includes a copy machine.

Furthermore, the present invention provides a network device management method for monitoring or controlling a device connected through a network, comprising: a specifying step of specifying a type of network device; and a group specifying step of specifying a device group to which the network device belongs in a case where the type of network device is not specified in the specifying step.

According to an aspect of the present invention, the network device management method further comprises: an acquisition step of acquiring data related to the network device; and a display control step of displaying the data related to the network device on a display unit.

According to an aspect of the network device management method of the present invention, in the display control step, the data related to the network device is displayed in a format for each type of the network device, or in a format for each device group.

According to an aspect of the network device management method of the present invention, in the display control step, the fact of display impossibility is notified in a case where a device group cannot be specified.

According to an aspect of the present invention, the network device management method further comprises: a first designating step of designating a network device to be monitored; and a second designating step of designating a data item related to the network device designated in the first designating step, wherein in the display control step, data for the designated item related to the designated network device is displayed.

According to an aspect of the network device management method of the present invention, in the second designating step, a state sheet for displaying data related to a state of a network device, or a job sheet for displaying information related to a printer queue, or a management sheet for displaying manager information, or a network sheet for displaying information related to a network protocol can be designated.

According to an aspect of the present invention, the network device management method further comprises an identification data acquisition step of acquiring identification data which specifies a type of network device, wherein in the specifying step, the type of network device is specified based on the identification data.

According to an aspect of the network device management method of the present invention, in the group specifying step, the device group to which the network device belongs is specified based on the identification data.

According to an aspect of the network device management method of the present invention, the identification data is MIB (Management Information Base) data.

According to an aspect of the network device management method of the present invention, the device group comprises plural types of network devices.

According to an aspect of the network device management method of the present invention, the type of network device specifies a device on the network.

According to an aspect of the network device management method of the present invention, the network device includes a printer.

According to an aspect of the network device management method of the present invention, the network device includes a copy machine.

Furthermore, the present invention provides a storage medium storing a network device management program for monitoring or controlling a device connected through a network, the management program comprising: a specifying step of specifying a type of network device; and a group specifying step of specifying a device group to which the network device belongs in a case where the type of network device is not specified in the specifying step.

According to an aspect of the storage medium of the present invention, the management program further comprises: an acquisition step of acquiring data related to the network device; and a display control step of displaying the data related to the network device on a display unit.

According to an aspect of the storage medium of the present invention, in the display control step, the data related to the network device is displayed in a format for each type of the network device, or in a format for each device group.

According to an aspect of the storage medium of the present invention, in the display control step, the fact of display impossibility is notified in a case where a device group cannot be specified.

According to an aspect of the storage medium of the present invention, the management program further comprises: a first designating step of designating a network device to be monitored; and a second designating step of designating a data item related to the network device designated in the first designating step, wherein in the display control step, data for the designated item related to the designated network device is displayed.

According to an aspect of the storage medium of the present invention, in the second designating step, a state sheet for displaying data related to a state of a network device, or a job sheet for displaying information related to a printer queue, or a management sheet for displaying manager information, or a network sheet for displaying information related to a network protocol can be designated.

According to an aspect of the storage medium of the present invention, the management program further comprises an identification data acquisition step of acquiring identification data which specifies a type of network device, wherein in the specifying step, the type of network device is specified based on the identification data.

According to an aspect of the storage medium of the present invention, in the group specifying step, the device group to which the network device belongs is specified based on the identification data.

According to an aspect of the storage medium of the present invention, the identification data is MIB (Management Information Base) data.

According to an aspect of the storage medium of the present invention, the device group comprises plural types of network devices.

According to an aspect of the storage medium of the present invention, the type of network device specifies a device on the network.

According to an aspect of the storage medium of the present invention, the network device includes a printer.

According to an aspect of the storage medium of the present invention, the network device includes a copy machine.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

Hereinafter, the network device management apparatus and management method according to the present embodiment will be described with reference to the drawings.

Figure 1:
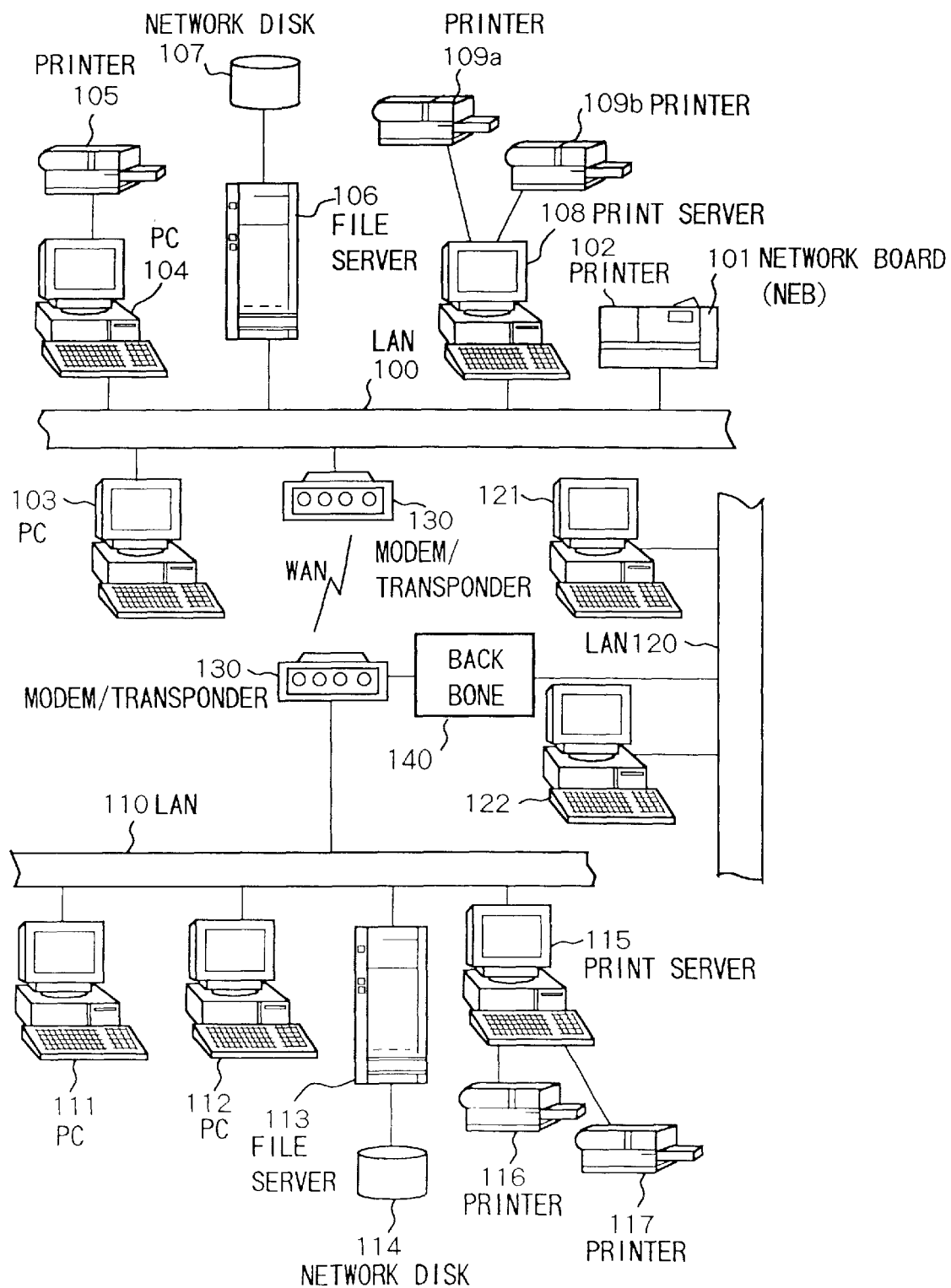
FIG. 1 is an illustrative diagram showing the state where a network board, provided for connecting a printer of the present embodiment to a network, is connected to a printer having an open-type architecture.

FIG. 1 is an illustrative diagram showing the state where a network board (NEB) 101, provided for connecting a printer to a network, is connected to a printer 102 having an open-type architecture. The NEB 101 is connected to a Local Area Network (LAN) 100 through a LAN interface such as Ethernet Interface 10Base-2 having a coaxial connector or 10Base-T having RJ-45.

A plurality of personal computers (PC), e.g., PC 103 and 104, are also connected to the LAN 100 and can communicate with the NEB 101 under the control of a network operating system. In this state, a PC, e.g., the PC 103, can be designated as a network manager. The PC may be connected to a local printer such as a printer 105 connected to the PC 104.

A file server 106 is connected to the LAN 100. The file server 106 manages access to files stored in a network disk 107 having a large capacity (e.g., 10 gigabyte). A print server 108 controls printers 109a and 109b which are directly connected or the remote printer 105 to perform printing. Other peripheral devices not shown in the drawing may be connected to the LAN 100.

More specifically, in the network shown in FIG. 1, network software such as Novell or UNIX can be used to perform efficient communication among various network members. Any network software e.g., Netware™ by Novell, Inc. (NetWare is a trademark of Novell, Inc. Hereinafter, the trademark will be omitted), may be used. Detailed description related to this software package is available in the on-line documentation included in the NetWare package. The on-line documentation or the NetWare package can be purchased from Novell, Inc.

The configuration of FIG. 1 is now briefly described. The file server 106 serves as a file manager managing data file reception, storage, queueing, cacheing, and transmission among LAN members. For instance, data files generated respectively by the PC 103 and PC 104 are sent to the file server 106. The file server 106 arranges the data files in order, and transmits the arranged data files to the printer 109 in accordance with a command from the print server 108.

Each of the PCs 103 and 104 is a normal PC which is capable of data file generation, transmission of the generated data files to the LAN 100, file reception from the LAN 100, and displaying and/or processing of the received files. Note that although personal computers are shown in FIG. 1, other computer devices which are appropriate for executing network software may be used. For instance, in a case where UNIX software is used, UNIX work stations may be included in the network. These UNIX work stations can be used with PCs shown in FIG. 1 under proper conditions.

Normally, a LAN such as the LAN 100 provides services to local user groups, e.g., user groups in the same building or on the same floor or on a number of consecutive floors. As users become more distant, e.g., if one of users is located in another building or another area or the like, a wide area network (WAN) may be formed. A WAN is an aggregated LAN basically formed by connecting a number of LANs with high-speed digital lines, such as telephone lines employing the integrated services digital network (ISDN). Thus, as shown in FIG. 1, LAN 100, LAN 110, and LAN 120 are connected through a modulator/demodulator (MODEM)/transponder (MODEM/ROUTER) 130 and a back bone (BACK BONE) 140, thereby forming a WAN. These LANs are electrically connected via a number of buses. Each of the LANs includes a dedicated PC and, although not necessarily required, normally includes a file server and a print server.

As shown in FIG. 1, LAN 110 comprises PCs 111 and 112, file server 113, network disk 114, print server 115, printer 116 and printer 117. On the other hand, the LAN 120 only comprises PCs 121 and 122. Devices connected to the LAN 100, LAN 110, and LAN 120 can access functions of other LAN devices via WAN.

As a method of managing devices on the network constructing the above-described large-scale network system, various attempts have been made by a large number of organizations for standardization. The International Organization for Standardization (ISO) has proposed a general-purpose standard framework, called an Open System Interconnect (OSI) model. The OSI model for a network management protocol is called Common Management Information Protocol (CMIP). CMIP is a network management protocol commonly used in Europe.

In the United States, as a more commonly used network management protocol, a modified protocol of the CMIP, called Simple Network Management Protocol (SNMP) is used (for further details, see *Introduction to TCP/IP Network Management for Practical Management* (originally titled, *The Simple Book*); M. T. Rose; translated by Takeshi Nishida, Toppan, 1992).

According to the SNMP, a network management system comprises at least one network management station (NMS), a plurality of nodes subjected to management, each having an agent, and a network management protocol used when the management station and agent exchange management data. A user communicates with agent software on a management-subjected node by using the network management software on the NMS, thereby acquiring or modifying data on the network.

Herein, an agent is a software running as a background process for each target apparatus. When a user requests management data to an apparatus on a network, management software puts object identification data into a management packet or a frame and sends the management packet to a target agent. The agent interprets the object identification data, extracts data corresponding to the object identification data, and puts the extracted data into a packet to be sent back to the user. Sometimes the agent accesses a process necessary for data extraction.

Figure 4:
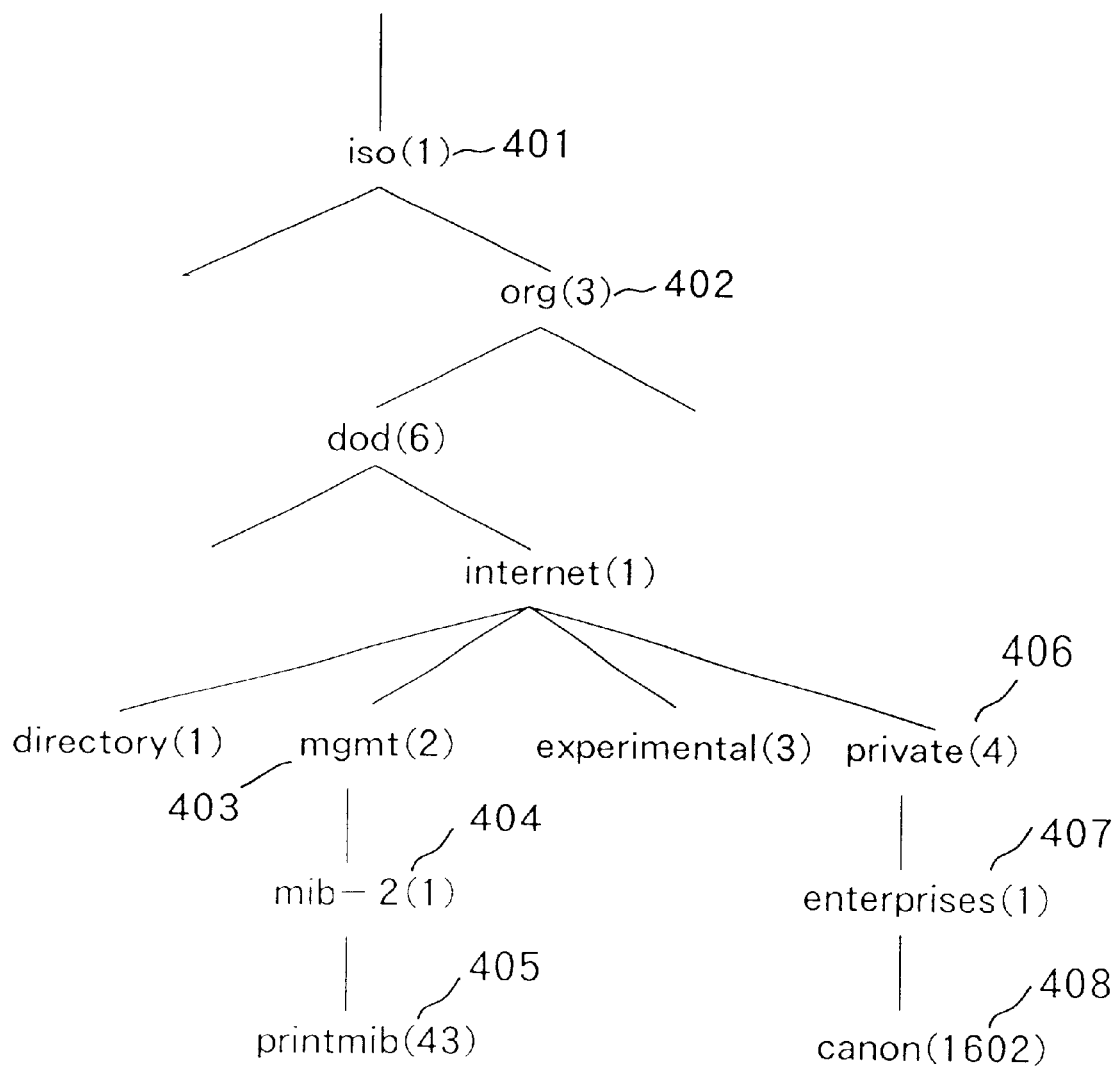
FIG. 4 is a conceptualized view showing a structure of an MIB (Management Information Base)

Furthermore, an agent has data regarding the device in the form of database. The database is called Management Information Base (MIB). FIG. 4 is a conceptualized view showing the structure of the MIB. As shown in FIG. 4, MIB has a tree structure and all nodes are uniquely numbered. In FIG. 4, the number in the parenthesis is the identifier of the node. For instance, the identifier of a node 401 is "1". Since the identifier of a node 402 is "3" below the node 401, the identifier of the node 402 is described as "1·3". Similarly, the identifier of a node 403 is described as "1·3·6·1·2". The identifier of a node is referred to as an object identifier.

The MIB structure is called a Structure of Management Information (SMI), and is specified by the standard called "RFC 1155 Structure and Identification of Management Information for TCP/IP-based Internets."

FIG. 4 is a partial extract of the MIB which is specified as a standard.

Reference numeral 404 denotes the host node of objects called a standard MIB. Devices managed by the SNMP comprise this MIB as a standard. The detailed structure of objects subordinate to the host node is specified by the "RFC 1213 Management Information Base for Network Management of TCP/IP-based Internets (MIB-II)."

Reference numeral 405 denotes the host node of objects called a printer MIB. Printers managed by the SNMP comprise this MIB as a standard. The detailed structure of objects subordinate to the host node is specified by the "RFC 1759 Printer MIB."

Reference numeral 406 denotes a private MIB, which serves as the host node for defining an original MIB by companies and organizations. For CANON Kabushiki Kaisha, the enterprise number "1602" is assigned for defining an original MIB. The host node 408 defining Canon MIB, which is the Canon's unique MIB, is subordinate to the node 407 indicative of an enterprise. The object identifier of the host node of the Canon MIB is "1·3·6·1·4·1·1602".

<Integrating Agent in Network Board>

An example of using an agent is to integrate an agent in a network board for connecting a printer to a network. By this, the printer can be managed by network management software. A user can acquire and modify information concerning a printer subjected to control by using the network management software. More specifically, for instance, a character string displayed on a liquid crystal display of the printer can be obtained, or a paper cassette set as a default can be changed. Hereinafter, description will be provided on an example of connecting the network board (NEB) having an agent to a printer.

Figure 2:
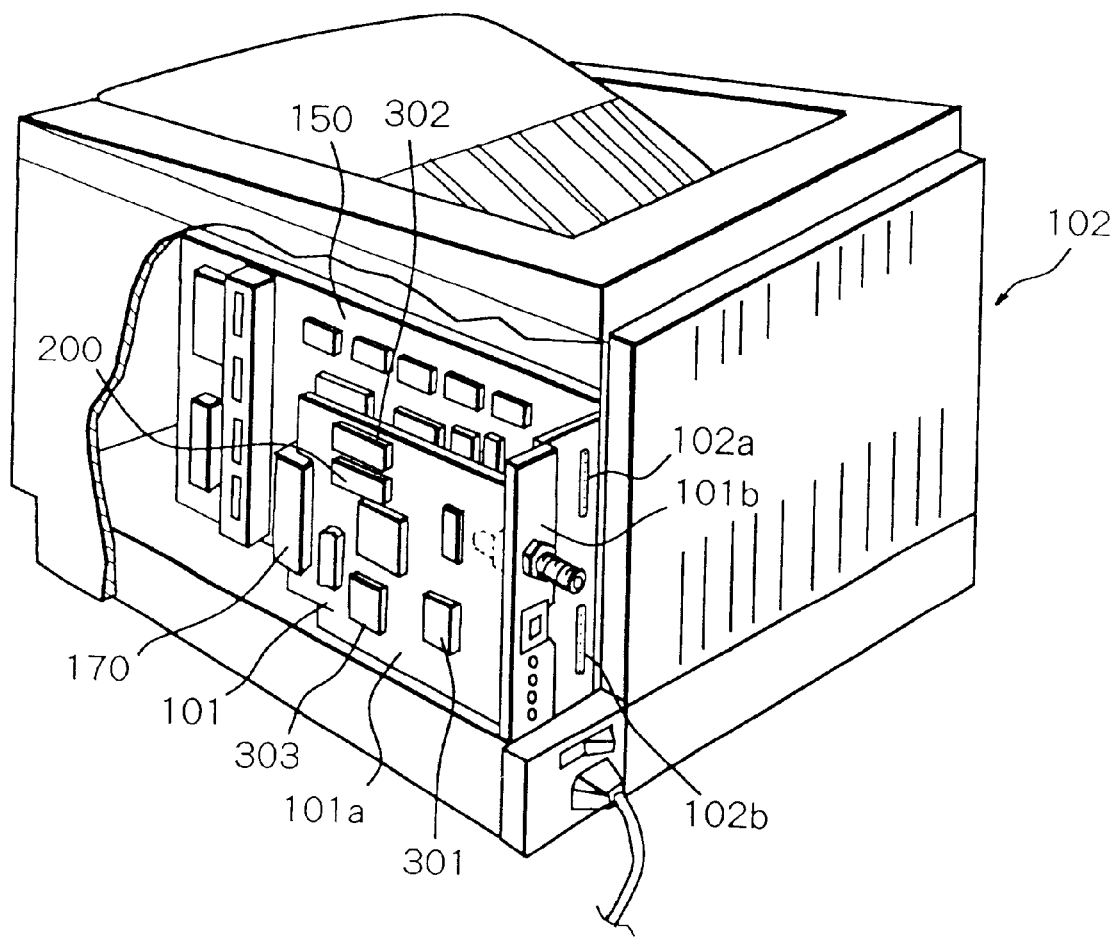
FIG. 2 is a partially cut-away view showing an embodiment in which a network board having an agent is connected to a printer.

As shown in FIG. 2, the NEB 101 is incorporated in an internally extended I/O slot of the printer 102. The NEB 101 serves as a "buried" network node having the function of the following processes and data storage function. The structure of the NEB 101 brings an advantage of characteristic auxiliary functions for controlling and managing a large multiple-area WAN network. These auxiliary functions include, for instance, printer control or printer state monitoring performed from a remote location on a network (e.g., office of a network manager), automatic management of a printer configuration for providing a guaranteed initial environment for the next user, specifying a printer load, and an access capability through the network for scheduling toner cartridge exchange. The auxiliary functions also include a printer log and usage statistics.

An important factor in the NEB (network board) design is the function which enables the NEB 101 to access a printer control state via a two-way interface such as a shared memory 200. Besides the shared memory, an interface such as an SCSI interface or the like may be used. By this, printer operation data can be sent to the NEB 101 or an external network node so as to enable programming of numerous convenient auxiliary functions. A block of printing image data and control data is generated by a microprocessor 301 on the NEB 101, written in the shared memory 200, and read by the printer 102. Similarly, printer state data is sent from the printer 102 to the shared memory 200, and read by the microprocessor 301 on the NEB.

FIG. 2 is a partially cut-away view of the printer 102 on which the NEB 101 is installed. As shown in FIG. 2, the NEB 101 is constructed by a printer circuit board 101*a* to which a face plate 101*b* for network connection is attached. The NEB 101 is connected to a printer interface card 150 through a connector 170. The printer interface card 150 directly controls a printer engine of the printer 102. Print data and a printer state command are inputted from the NEB 101 to the printer interface card 150 through the connector 170. Vice versa, a printer state command is acquired from the printer interface card 150 through the connector 170. The NEB 101 communicates the data on the LAN 100 through a network connector on the face plate 101*b*. The printer 102 can also receive print data from a conventionally used serial port 102*a* and a parallel port 102*b*.

Figure 3:
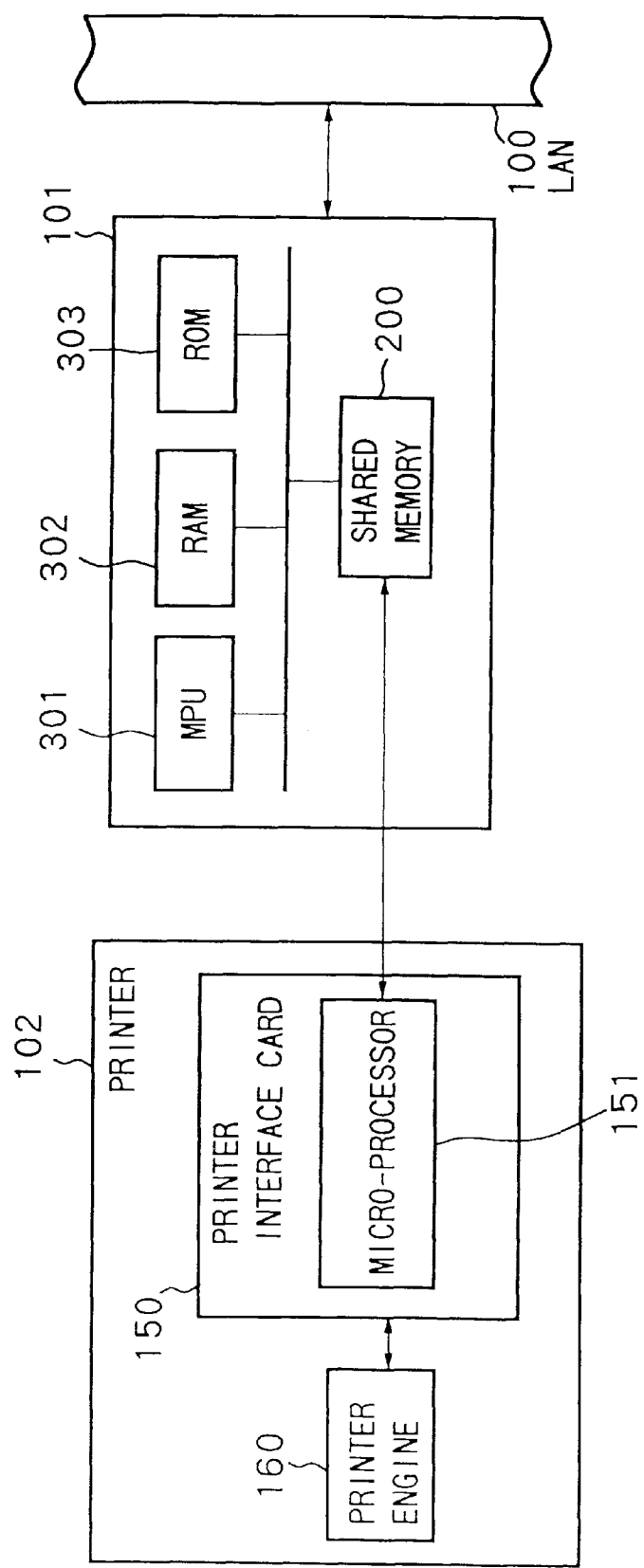
FIG. 3 is a block diagram showing electric connections among a network board, a printer, and a LAN.

FIG. 3 is a block diagram showing electric connections between the NEB 101, printer 102 and LAN 100. The NEB 101 is directly connected to the LAN 100 through a LAN interface and connected to the printer 102 through the printer interface card 150. The NEB 101 includes: a microprocessor (MPU) 301 for controlling the NEB 101; a ROM 303 for storing operation programs of the microprocessor 301; a RAM 302 used as a work area for the microprocessor 301 to execute the programs; and shared memory 200 which enables the NEB 101 and the printer interface card 105 to exchange data bi-directionally, all of which are bi-directionally connected through an internal bus. Programs necessary for the NEB 101 to operate as a SNMP agent are stored in the ROM 303. The microprocessor 301 operates in accordance with the programs stored in the ROM 303 and uses the RAM 302 as a work area. The microprocessor 301 also utilizes the shared memory 200 as a buffer area in order to bi-directionally communicate with the printer interface card 150.

A microprocessor 151 on the printer interface card 150 exchanges data with the NEB 101 through the shared memory 200 provided on the NEB 101. The microprocessor 151 on the printer interface card 150 also communicates with a printer engine 160 which drives the printing mechanism.

<Construction on PC Side>

Hereinafter, the PC side where network management software runs is described.

Figure 5:
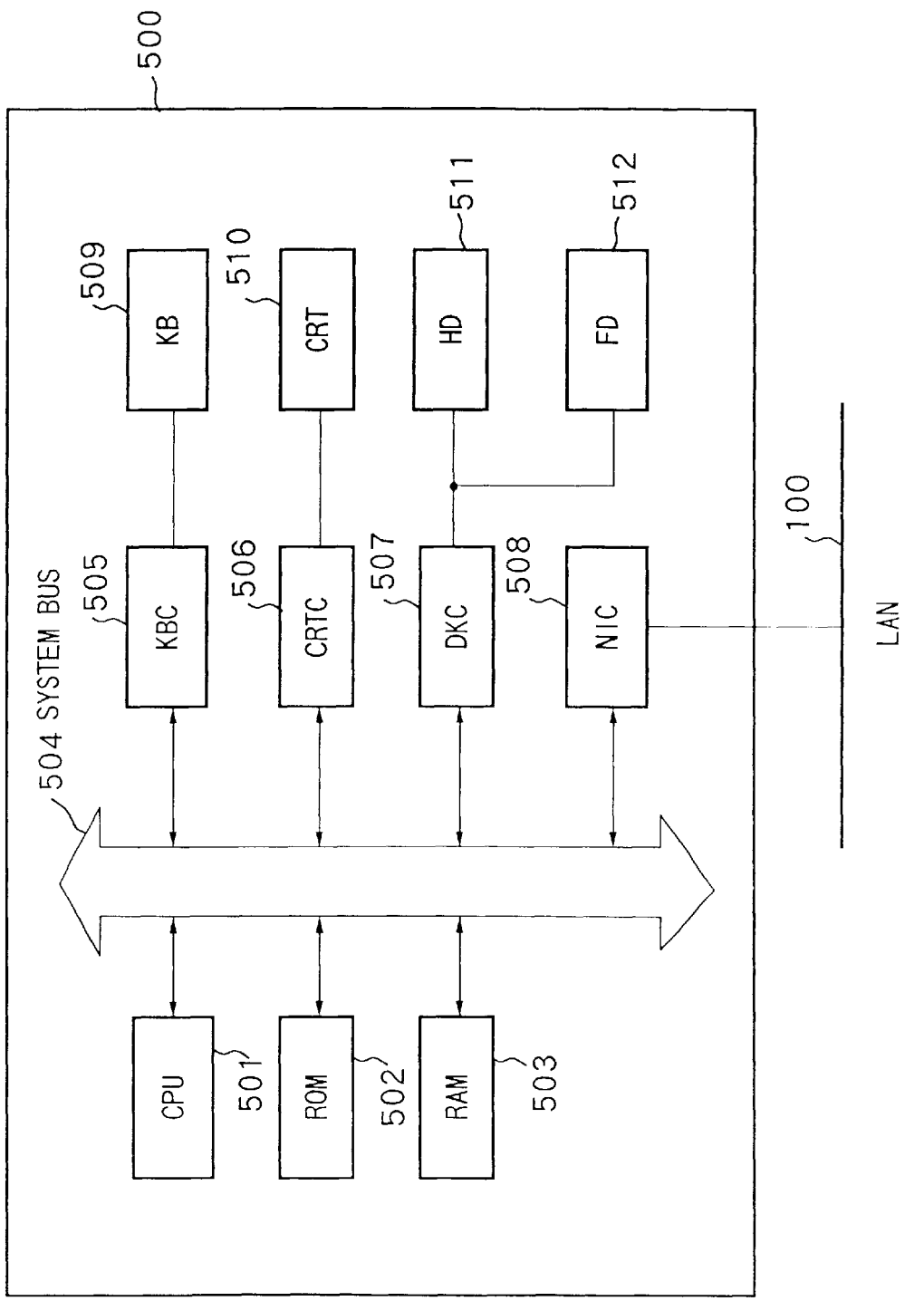
FIG. 5 is a block diagram showing a construction of a PC where a conventional network manager or a network manager according to the present embodiment is operable.

FIG. 5 is a block diagram showing a construction of a PC where network management software is operable.

Referring to FIG. 5, reference numeral 500 denotes a PC (computer) where network management software is operated, and is equivalent to the PC 103 shown in FIG. 1. The PC 500 comprises a CPU 501 which executes a network management program, stored in a ROM 502 or hard disc (HD) 511 or supplied by a floppy disk drive (FD) 512, and integrally controls the devices connected to a system bus 504. Reference numeral 503 denotes a RAM serving as a main memory and a work area of the CPU 501. Reference numeral 505 denotes a keyboard controller (KBC) which controls command inputs from a keyboard (KB) 509 or a pointing device (not shown). Reference numeral 506 denotes a CRT controller (CRTC) which controls displaying of a CRT display (CRT) 510. Reference numeral 507 denotes a disk controller (DKC) which controls accesses to hard disk (HD) 511, storing boot programs, various applications, editing files, user files, network management program and so forth, and a floppy disc controller (FD) 512. Reference numeral 508 denotes a network interface card (NIC) for bi-directionally exchanging data with an agent or a network device via the LAN 100. Note that although the present embodiment in terms of hardware is realized by a PC having the similar structure as that described by FIG. 5, the present embodiment is characterized by the control operation of software as will be described below.

The network management apparatus according to the present embodiment is realized by a PC having the same structure as that of the PC shown in FIG. 5 which realizes a network management apparatus. The hard disk (HD) 511 stores a network management software program according to the present embodiment, which becomes an operation subject in the following description. In the following description, operation on the hardware is executed by the CPU 501 unless stated otherwise. A control subject on software is the network management software stored in the hard disk (HD) 511. In the present embodiment, it is assumed that WINDOWS 95 (Microsoft Corporation) is used as an operating system. However, the present invention is not limited to this. Note that the network management program according to the present embodiment may be supplied in the form of a storage medium, e.g., a floppy disk or a CD-ROM or the like. In this case, the program stored in a storage medium is read by the floppy disk controller (FD) 512 or a CD-ROM drive controller (not shown) or the like, and installed in the hard disk (HD) 511.

Figure 6:
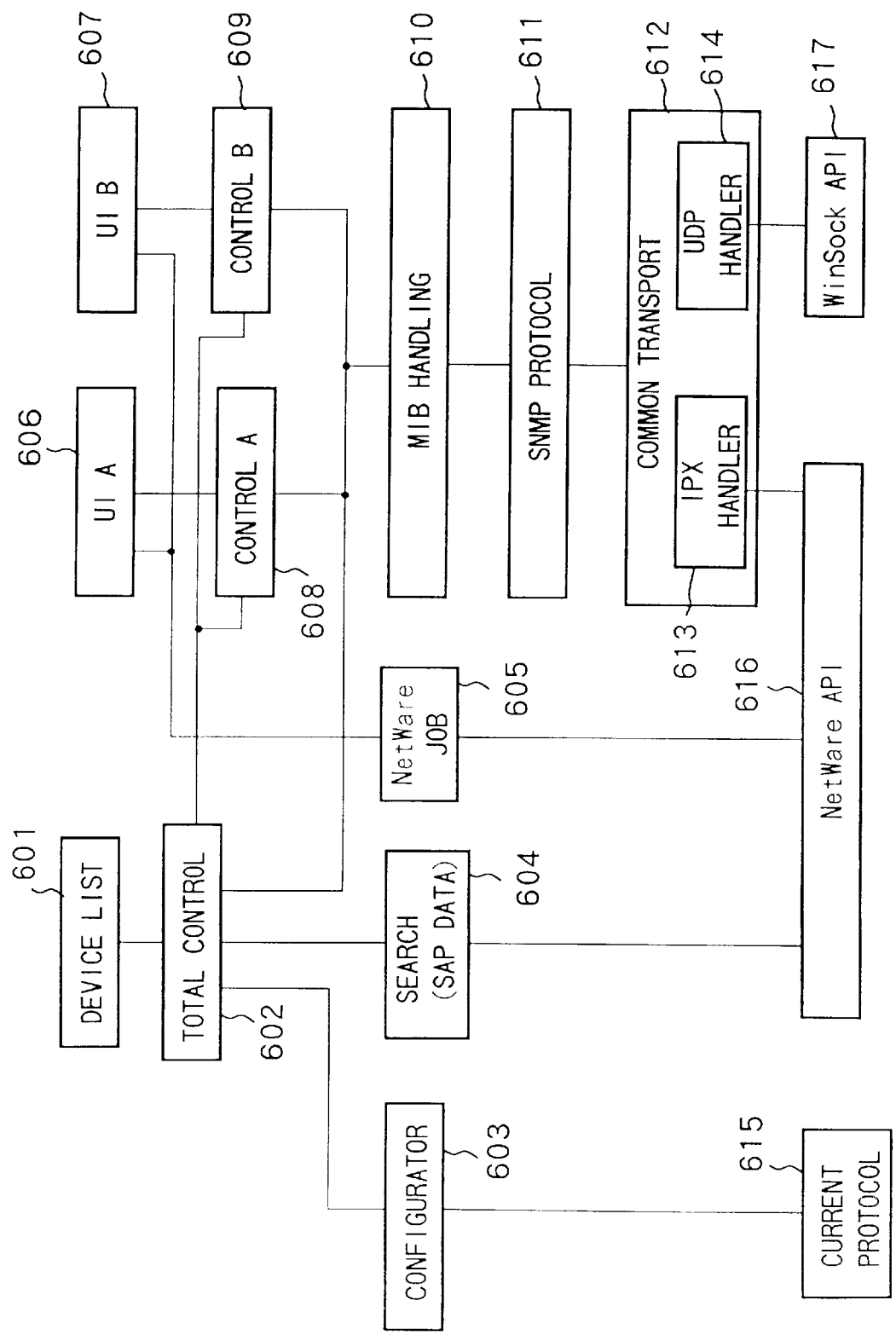
FIG. 6 is a diagram showing a module construction of network management software.

FIG. 6 is a diagram showing a module construction of network management software according to the present embodiment. The network management software is stored in the hard disk 511 in FIG. 5 and executed by the CPU 501. In this case, the CPU 501 uses the RAM 503 as a work area.

Referring to FIG. 6, reference numeral 601 denotes a device list module for displaying a list of devices connected to the network. Reference numeral 602 denotes a total control module for controlling other modules based on a command from a device list. Reference numeral 603 denotes a configurator which executes special processing related to network setting for an agent. Reference numeral 604 denotes a search module for searching a device connected to the network. A device searched by the search module 604 is listed by the device list 601. Reference numeral 605 denotes a NetWare job module for acquiring a print job state from a network server by using NetWare API 616 (see "NetWare Programmer's Guide for C" published by Novell, Inc. The book is available for purchase from Novell, Inc.). Reference numerals 606 and 607 respectively denote a user interface (UI) module for displaying a device detail window which will be described later. The UI module exists in each device which displays detail data. Reference numerals 608 and 609 respectively denote a control module which performs controls specific to devices subjected to detail data acquisition. Similar to the UI module, the control module exists in each device which displays detail data. The control A module 608 and control B module 609 acquire MIB data from a management-subjected device using an MIB module 610, perform data conversion as necessary, and transfer the data to the corresponding UI A module 606 or UI B module 607.

The MIB module 610 performs conversion of an object identifier and an object key. Herein, an object key is an integer having 32 bits, and corresponds to an object identifier on a one-to-one basis. Since the object identifier is a variable-length identifier, it is difficult to handle when network management software is installed. Therefore, the network management software according to the present embodiment internally employs a fixed-length identifier corresponding to the object identifier on a one-to-one basis. Modules superior to the MIB module 610 handle MIB data by using the object key. This enables easy installation of network management software.

Reference numeral 611 denotes an SNMP module for performing transmission and reception of an SNMP packet. Reference numeral 612 denotes a common transport module for absorbing a difference in a subordinate protocol. In practice, either an IPX handler 613 or a UDP handler 614 transfers data in accordance with a protocol selected by a user at the time of operation. Note that the UDP handler comprises WinSock 617 (see the specification of Windows Socket API v1.1 included in, e.g., Visual C++ which is a compiler provided by Microsoft Corporation; the specification is available at various places). A current protocol 615 used by the configurator 603 indicates either the IPX protocol or the UDP protocol selected by a user at the time of operation. Note that the network management software according to the present invention will be referred to as "NetSpot" in the following description.

<Installation of NetSpot>

A file necessary for NetSpot installation is normally provided with a physical storage medium such as a floppy disk (FD) or a CD-ROM or the like or transmitted through a network. A user obtains the file necessary for installation by the above means and starts installation of the NetSpot in accordance with a predetermined installation steps. The installation steps of the NetSpot are the same as installation steps of other general software. More specifically, when a user starts an installer of NetSpot on a personal computer (PC), the installer automatically executes installation. The installer copies files necessary for NetSpot operation to hard disc of a PC. If necessary, a file necessary for NetSpot operation is modified or newly generated by requiring a user to input necessary data.

Data inputted by a user at the time of NetSpot installation includes selection of two types of operation modes (manager mode and general user mode).

<NetSpot Operation Mode>

As mentioned above, NetSpot has two types of operation modes: the manager mode and general user mode. At the time of NetSpot installation, a user designates one of the operation modes. In order for a user to change the operation mode, NetSpot needs to be reinstalled, in principle.

Herein, the "manager mode" is a mode for a user having a specific authority (e.g., network manager or a network periphery manager), and the "general user mode" is a mode for a general user not having a specific authority.

The functions used in the general user mode are limited compared to the functions used in the manager mode. In other words, the functions used in the general user mode are part of the functions in the manager mode.

<Starting-Up NetSpot and Password Authentication>

In a case where NetSpot is installed in a general user mode, the NetSpot can be started by executing the NetSpot execution file. In a case where NetSpot is installed in the manager mode, a user is required to input a NetSpot password immediately after executing the NetSpot execution file. The user cannot start-up the NetSpot in the manager mode without inputting an appropriate password. In the NetSpot manager mode, a user can perform various setting for the network periphery devices. Wrong setting may cause malfunction or breakdown of the devices. Therefore, to prevent a general user from starting up the NetSpot in the manager mode, password input is required when starting the manager mode. At the time of password input being asked, if a user does not input a password, NetSpot is started in the general user mode.

When the NetSpot is installed in the manager mode, a user who is performing the installation may set a password for starting up the NetSpot in the manager mode. Moreover, a user can set or change the password for starting up the NetSpot in the manager mode, after NetSpot is started in the manager mode.

The set or changed NetSpot password is used the next time NetSpot is started in the manager mode. NetSpot in the manager mode is started if an inputted password coincides with the set value, but is not started if the password does not coincide.

Instead of requiring a user to input the NetSpot password at the time of start-up, the NetSpot manager mode may operate to determine whether or not the user is logged in the NetWare file server as a manager. In other words, when the NetSpot is started in the manager mode, if the user has already been logged in the NetSpot file server as a manager, the NetWare password input operation can be eliminated.

In the actual NetSpot, a plurality of managers exist in a network environment. Thus, there is a case in which managers are different for each of the network periphery devices. Considering this case, in the NetSpot manager mode, in addition to the NetSpot password required to input at the time of starting up the manager mode, a device password can be set for each network interface board as an option. This supports the function of device password authentication, performed for each network periphery device, when a user selects a network periphery device from a device list display window.

The device password for selecting a network periphery device is set for each network interface board by a manager in accordance with necessity. In a case where a device password is set for a network interface board, the device password set by the manager is authenticated for each network interface board when a user newly selects a network periphery device from a device list display window in the NetSpot manager mode, i.e., when a user newly opens a device detail window.

By setting the same device password for selecting a network periphery device as the NetSpot password which is inputted at the time of starting the manager mode, device password input operation can be eliminated when a network periphery device is newly selected from the device list display window in the NetSpot manager mode.

<Exclusive Control of NetSpot>

In a case where a plurality of NetSpot manager modes are started for a single network periphery device, incoherence may be found in the setting of the network periphery device or the network. For this reason, the NetSpot manager mode which can be started is limited to one for a single network periphery device. In other words, a single network periphery device cannot be selected by a plurality of NetSpot manager modes. On the other hand, a plurality of NetSpot general user modes can be started for a single network periphery device. In other words, a single network periphery device can be selected by a plurality of NetSpot general user modes.

<Transitional View of Window Displayed by NetSpot>

Figure 7:
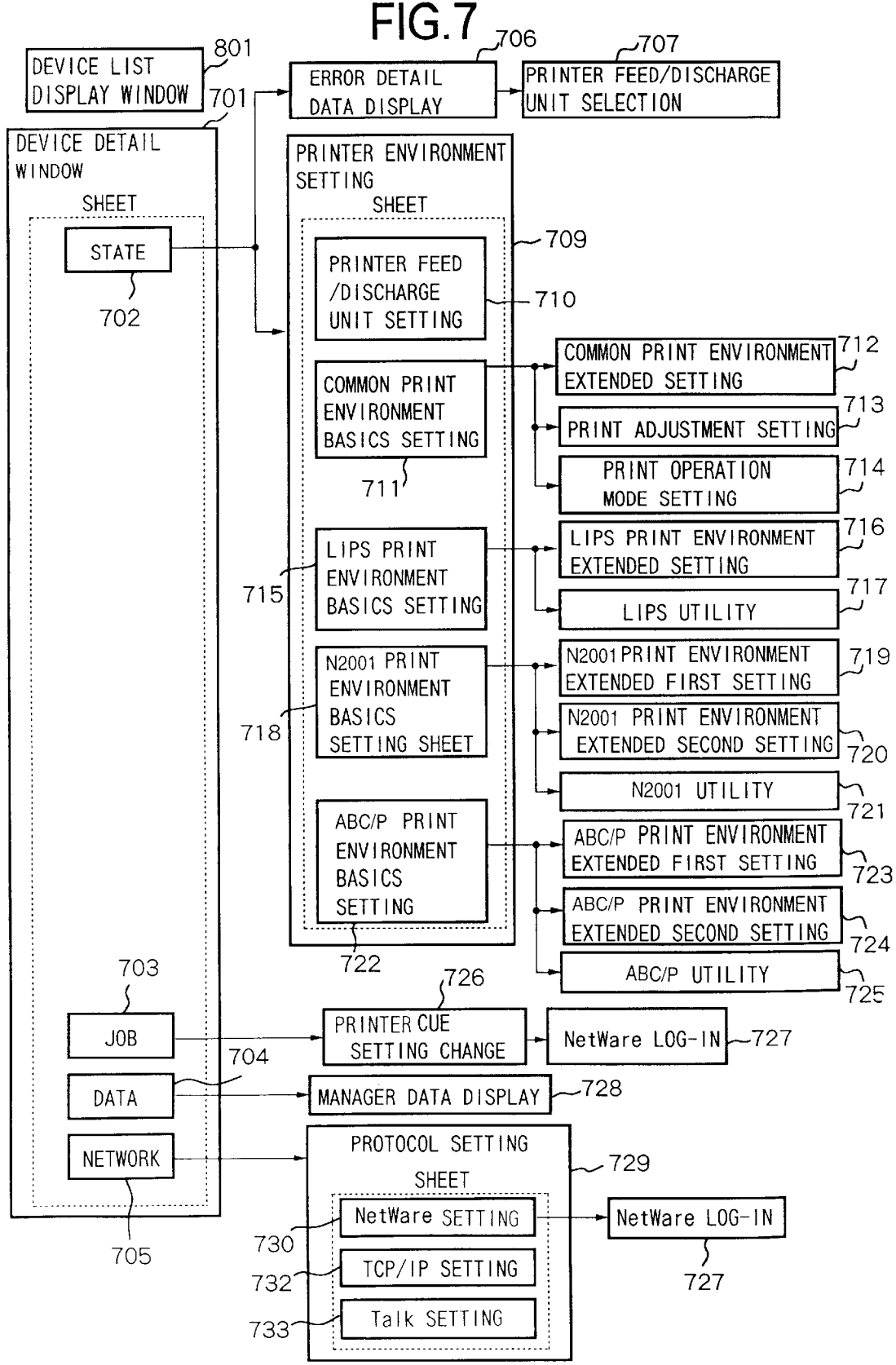
FIG. 7 is a transitional view of windows when NetSpot is started in the manager mode.
Figure 8:
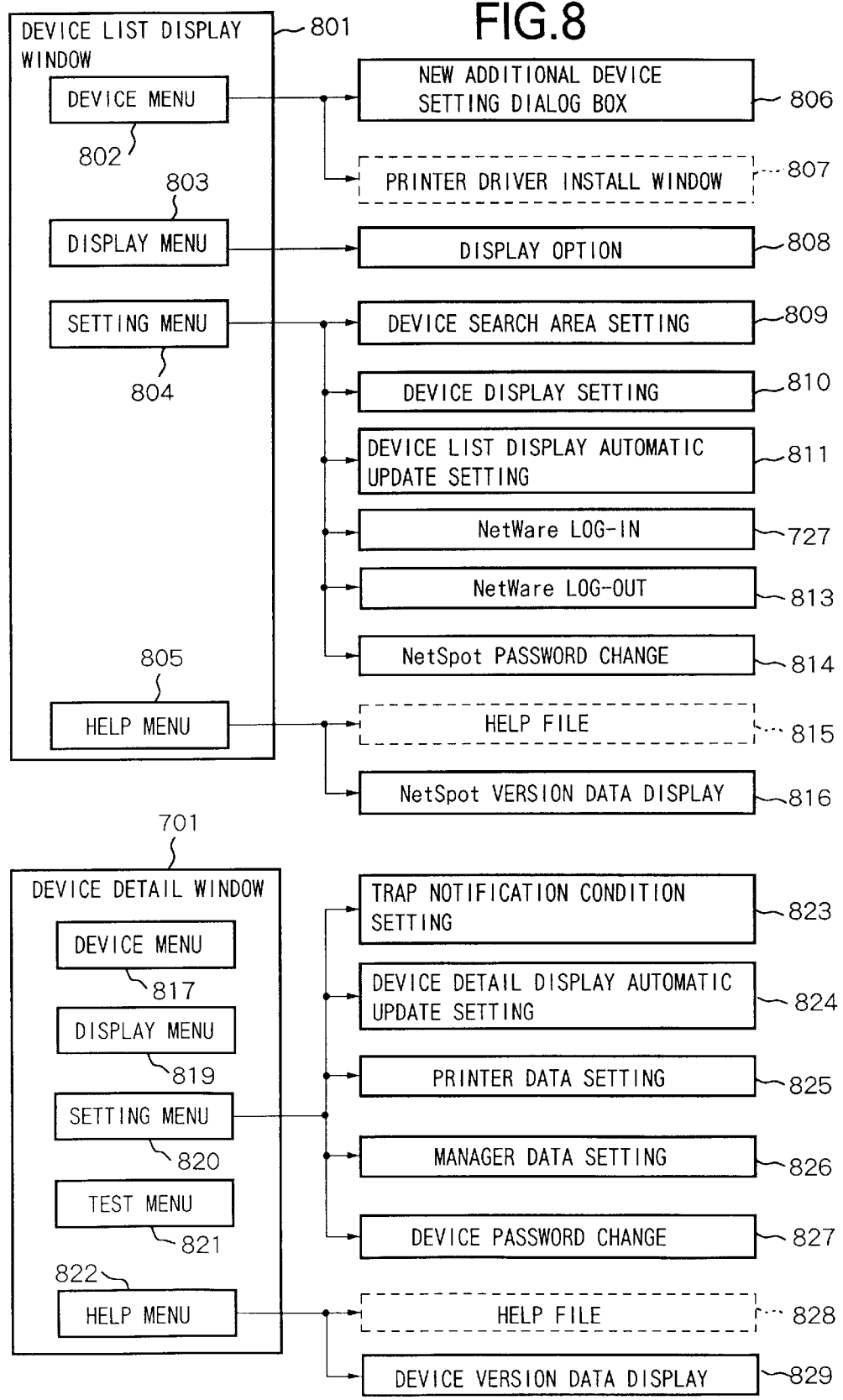
FIG. 8 is a transitional view of windows when NetSpot is started in the manager mode.

FIGS. 7 and 8 are transitional views of windows displayed sequentially by the NetSpot in accordance with user's command, when the user starts the NetSpot in the manager mode. Note that the windows shown in FIGS. 7 and 8 are not all windows displayed by the NetSpot. Even if there is no command from a user, the NetSpot automatically displays various windows in accordance with the operation state of the NetSpot and data acquired from the network.

A user monitors an operation state of a network periphery device by viewing data displayed on the various windows displayed by the NetSpot. By setting an optimum value on these windows, the network periphery device can be controlled.

FIG. 7 is a list of dialogue boxes called from various sheets, which will be described later, when the NetSpot is started in the manager mode.

Figure 9:
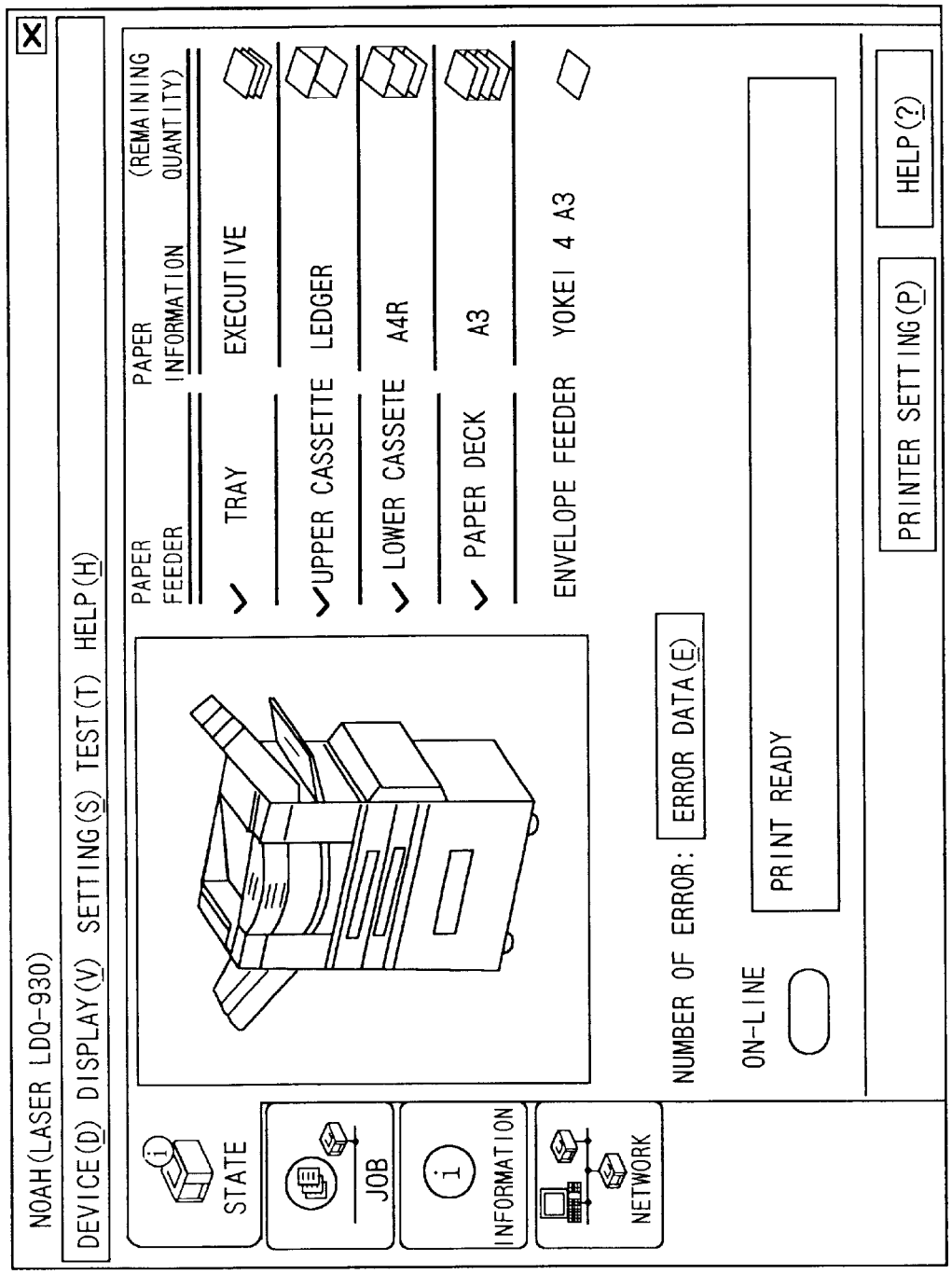
FIG. 9 is an illustration of a device detail window for a specific device, according to the present embodiment.

Referring to FIG. 7, reference numeral 701 denotes a device detail window exemplified in FIG. 9. The window 701 includes four sheets: a state sheet 702, a job sheet 703, a data sheet 704, and a network sheet 705.

From the state sheet 702, an error detail data display dialogue box 706 and a printer environment setting dialogue box 709 are displayed. A printer feed/discharge unit selection dialogue box 707 is selected from the error detail data display dialogue box 706.

The printer environment setting dialogue box 709 includes five sheets: a printer feed/discharge unit setting sheet 710, a common print environment basics setting sheet 711, a LIPS print environment basics setting sheet 715, an N2001 print environment basics setting sheet 718, and an ABC/P print environment basics setting sheet 722. Herein, LIPS, N2001, and ABC/P are the types of printer page description languages.

From the common print environment basics setting sheet 711, a common print environment extension setting dialogue box 712, a print adjustment setting dialogue box 713, and a print operation mode setting dialogue box 714 are called.

From the LIPS print environment basics setting sheet 715, a LIPS print environment extension setting dialogue box 716 and a LIPS utility dialogue box 717 are called.

From the N2001 print environment basics setting sheet 718, an N2001 print environment extension first setting dialogue box 719, an N2001 print environment extension second setting dialogue box 720, and an N2001 utility dialogue box 721 are called.

From the ABC/P print environment basics setting sheet 722, an ABC/P print environment extension first setting dialogue box 723, an ABC/P print environment extension second setting dialogue box 724, and an ABC/P utility dialogue box 725 are called.

Next, from the job sheet 703, a printer queue setting change dialogue box 726 is called, then from the printer queue setting change dialogue box 726, a NetWare log-in dialogue box 727 is called. From the data sheet 704, a manager data display dialogue box 728 is called. Finally from the network sheet 705, a protocol setting dialogue box 729 is called.

The protocol setting dialogue box 729 has three sheets: a NetWare setting sheet 730, TCP/IP setting sheet 732, and an Talk setting sheet 733. From the NetWare setting sheet 730, the NetWare log-in dialogue box 727 is called. Note that the device list display window 801 will be described later in detail with reference to FIG. 8.

FIG. 8 is a list of dialogue boxes called from various menus, which will be described later, when the NetSpot is started in the manager mode.

Referring to FIG. 8, reference numeral 801 denotes a device list display window. The device list display window 801 has four menus: a device menu 802, a display menu 803, a setting menu 804, and a help menu 805. From the device menu 802, a new additional device setting dialogue box 806, and a printer driver install window 807 included in an operating system as a standard, are called. From the display menu 803, a display option dialogue box 808 is called. From the setting menu 804, a device search area setting dialogue box 809, a device display setting dialogue box 810, a device list display automatic update setting dialogue box 811, a NetWare log-in dialogue box 727, a NetWare log-out dialogue box 813, and a NetSpot password change dialogue box 814 for changing a password for executing the NetSpot are called. Finally, from the help menu 805, a help file window 815 for displaying a NetSpot help and a NetSpot version data display dialogue box 816 for displaying a NetSpot version are called.

Figure 10:
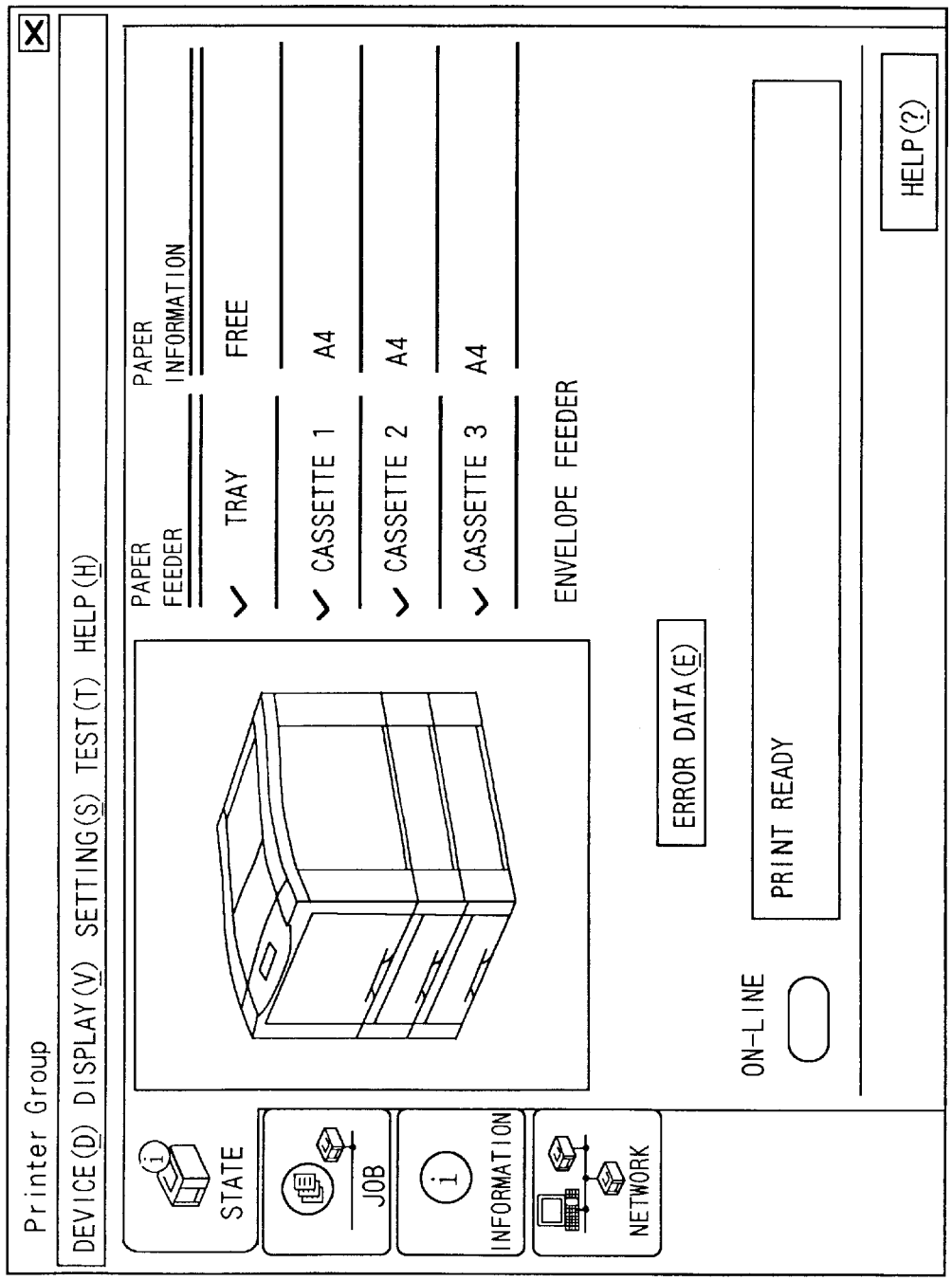
FIG. 10 is an illustration of a device detail window for a specific device group, according to the present embodiment.

<Device Detail Window (FIGS. 9 and 10)

When a user double clicks an icon indicative of a device on the device list display window 801, a device detail window shown in FIG. 9 or 10 is displayed. The process steps of displaying the device detail window will be described later. The number of device detail windows a user can open is limited to one for each device. When a user clicks a tab ("state", "job", "data", or "network") on the left side of the device detail window (FIG. 9), a sheet corresponding to each tab is moved to the front of the device detail window. The contents displayed on the device detail window differ for each type of devices. Furthermore, the contents displayed on the device detail window differ for the manager mode and a general user mode. In the general user mode, displayed items and changeable items are limited compared to the manager mode. If there are items that are not supported by the type of device being used, a mode being operated, or a network protocol being used, the items are displayed in one of the following manners.

(1) The item is displayed in gray, or not displayed, or the item is not changeable (Basically for a case where there is a possibility of the item becoming valid).

(2) The item is not displayed (Basically for a case where there is no possibility of the item becoming valid).

(3) The sheet of the device detail window is displayed in gray or is unselectable (Basically for a case where there is a possibility of the item becoming valid, and all items in the tab are not supported).

(4) The sheet of the device detail window is not displayed (Basically for a case where there is no possibility of the item becoming valid, and all items in a tab are not supported).

When registering a manager to a manager data table, if the manager registration to the manager data table of a device selected by a user requires time, a message is displayed to notify the user of the registration being executed.

When canceling a manager registration in the manager data table, if the cancellation of the manager registration in the manager data table of a device selected by a user requires time, a message is displayed to notify the user of the registration cancellation being executed.

In a case where a sheet or a dialogue box of the device detail window is displayed for the first time, if data acquisition from a device selected by a user requires time, a message is displayed to notify the user of the data acquisition being executed. If the data acquisition can be cancelled, a "quit" button is validated.

In a sheet or a dialogue box of the device detail window, if data setting to a device selected by a user requires time, a message is displayed to notify the user of the data setting being executed. If the data setting can be cancelled, a "quit" button is validated.

In execution of resetting a printer or a network interface board, if resetting a device selected by a user requires time, a message is displayed to notify the user of the resetting being executed. Besides resetting a printer or a network interface board, if command execution in a device selected by a user requires time in on-line/off-line/discharge setting of a printer, or initialization of a printer or a network interface board, or execution of commands such as various utilities or the like, a message is displayed to notify the user of the command execution.

<Process Steps of Displaying Device Detail Window>

Figure 11:
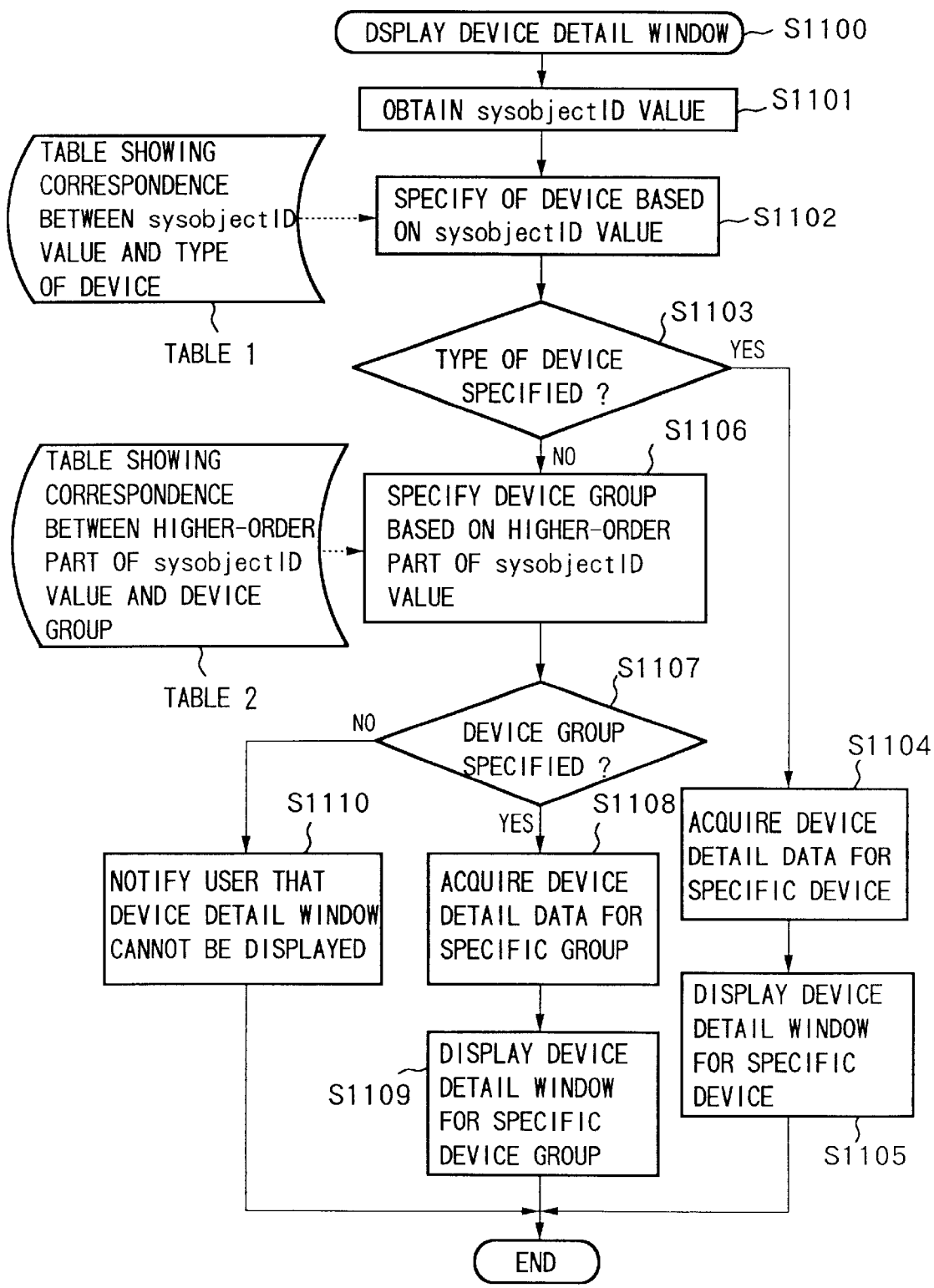
FIG. 11 is a flowchart showing a display method of a device detail window according to the present embodiment.

Hereinafter, the start of displaying a device detail window will be described with reference to FIG. 11.

In step S1100, displaying of a device detail window is started.

In step S1101, a sysObjectID value is obtained from the device. The sysObjectID is an object specified by the "RFC 1213 (MIB-II)," and the value is an object identifier indicative of an object subordinate to the enterprise extension MIB 407 in FIG. 4 (see Table 1).

TABLE 1

| sysObjectID Value | Type of Device |
| --- | --- |
| 1.3.6.1.4.1.1602.1.1.1 | laser beam printer 1 |
| 1.3.6.1.4.1.1602.1.1.2 | laser beam printer 2 |
| 1.3.6.1.4.1.1602.1.2.1 | bubble jet printer 1 |
| 1.3.6.1.4.1.1602.2.1.1 | copy machine 1 |
| 1.3.6.1.4.1.1602.2.2.1. | color copy machine 1 |

Table 1 is an example showing correspondence between the sysobjectID value and the type of device. Note that the sysobjectID values shown in Table 1 are hypothetical, thus differ from actual values. Note that a model of device may be used instead of the type of device. By this, detailed information specific to each model can be provided to the user.

In step S1102, the type of device is specified based on the sysObjectID value by referring to Table 1. Note that the type of device not included in Table 1 cannot be specified.

In step S1103, it is determined whether or not the type of device has been specified in step S1102. If the type has been specified, the process proceeds to step S1104 while if the type has not been specified, the process proceeds to step S1106.

In step S1104, device detail data for the specific device is acquired.

In step S1105, a device detail window for the specific device is displayed (see FIG. 9) by using the data acquired in step S1104. Then, the process ends in step S1111.

The processes in steps S1101 to S1105 are the same as that of the conventional device display window display method.

Table 2 is an example showing correspondence between a higher-order part of the sysObjectID value and a device group. Note that the sysObjectID values shown in Table 2 are hypothetical, thus differ from actual values. Note that the device group may be specified in the narrower term, e.g., laser beam printer, ink-jet printer or the like.

In step S1106, a device group is specified based on a higher-order part of the sysObjectID value by referring to Table 2. Note that a device group not included in Table 2 cannot be specified.

TABLE 2

| Higher-Order Part of sysObjectID Value | Device Group |
| --- | --- |
| 1.3.6.1.4.1.1602.1 | printer |
| 1.3.6.1.4.1.1602.2 | copy machine |

In step S1107, it is determined whether or not a device group has been specified in step S1106. If the device group has been specified, the process proceeds to step S1108 while if the device group has not been specified, the process proceeds to step S1110.

In step S1108, device detail data for the specific device group is acquired.

In step S1109, a device detail window for the specific device group is displayed (see FIG. 10) by using the data obtained in step S1108. Then, the process ends in step S1111.

The processes in steps S1106 to S1109 are the device detail window display method characteristic to the embodiment of the present invention.

In step S1110, the fact that the device detail window cannot be displayed is notified to a user. Then, the process ends in step S1111.

As has been described above, according to the present embodiment, even in a case where the type of a network device is unknown, if the device belongs to a predetermined device group, it is possible to display a device detail window for the device group. Therefore, for instance, even in a case where the type of printer is not specified for a device, as long as the device is specified as a printer, it is possible to display information necessary for the printer. The same technique applies in a case of a copy machine.

Note that the present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus, and reading the program codes by the computer system or a computer (CPU or MPU) of the apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

As has been set forth above, according to the present embodiment, even in a case where the type of network device is unknown, if the device belongs to a predetermined device group, the network device can be referred to by displaying the device detail window for the device group.

The present invention is not limited to the above embodiments and various changes and modifications can be made within the spirit and scope of the present invention. Therefore, to appraise the public of the scope of the present invention, the following claims are made.

What is claimed is:

1. A network device management apparatus for monitoring or controlling a network device connected through a network, comprising:

an acquisition unit adapted to acquire data related to a network device;

a specification unit adapted to specify a type of network device, based on the data acquired by said acquisition unit; and a group specification unit adapted to specify at least one of a plurality of device groups to which the network device belongs, in a case where the type of network device is not specified by said specification unit.

2. The network device management apparatus according to claim 1, further comprising:

a display control unit adapted to display the data related to the network device on a display unit.

3. The network device management apparatus according to claim 2, wherein said display control unit displays the data related to the network device in a format for each type of the network device, or in a format for each of the plurality of device groups.

4. The network device management apparatus according to claim 2, wherein said display control unit notifies of a display impossibility, in a case where a device group cannot be specified.

5. The network device management apparatus according to claim 2, further comprising:

a first designation unit adapted to designate a network device to be monitored; and a second designation unit adapted to designate a data item related to the network device designated by said first designation unit, wherein said display control unit displays data for the designated data item related to the designated network device.

6. The network device management apparatus according to claim 5, wherein said second designation unit designates at least one of a state sheet for displaying data related to a state of a network device, a job sheet for displaying information related to a printer queue, a management sheet for displaying manager information, and a network sheet for displaying information related to a network protocol.

7. The network device management apparatus according to claim 1, further comprising an identification data acquisition unit adapted to acquire identification data that specifies a type of network device, wherein said specification unit specifies a type of network device based on the identification data.

8. The network device management apparatus according to claim 7, wherein said group specification unit specifies a device group to which the network device belongs based on the identification data.

9. The network device management apparatus according to claim 7, wherein the identification data is MIB (Management Information Base) data.

10. The network device management apparatus according to claim 1, wherein the network device, which satisfies previously defined conditions, is a member of each of the plurality of device groups.

11. The network device management apparatus according to claim 1, wherein the type of network device specifies a device on the network.

12. The network device management apparatus according to claim 1, wherein the network device includes a printer.

13. The network device management apparatus according to claim 1, wherein the network device includes a copy machine.

14. A network device management method for monitoring or controlling a network device connected through a network, comprising:

an acquisition step of acquiring data related to a network device;

a specification step of specifying a type of network device, based on the data acquired in said acquisition step; and a group specification step of specifying at least one of a plurality of device groups to which the network device belongs, in a case where the type of network device is not specified in said specification step.

15. The network device management method according to claim 14, further comprising a display control step of displaying the data related to the network device on a display unit.

16. The network device management method according to claim 15, wherein, in said display control step, the data related to the network device is displayed in a format for each type of the network device, or in a format for each of the plurality of device groups.

17. The network device management method according to claim 15, wherein, in said display control step, a display impossibility is notified, in a case where a device group cannot be specified.

18. The network device management method according to claim 15, further comprising:

a first designation step of designating a network device to be monitored; and a second designation step of designating a data item related to the network device designated in said first designation step, wherein, in said display control step, data for the designated data item related to the designated network device is displayed.

19. The network device management method according to claim 18, wherein, in said second designation step, at least one of a state sheet for displaying data related to a state of a network device, a job sheet for displaying information related to a printer queue, a management sheet for displaying manager information, and a network sheet for displaying information related to a network protocol is designated.

20. The network device management method according to claim 14, further comprising an identification data acquisition step of acquiring identification data that specifies a type of network device, wherein a type of network device is specified in said specification step based on the identification data.

21. The network device management method according to claim 20, wherein, in said group specification step, a device group to which the network device belongs is specified based on the identification data.

22. The network device management method according to claim 20, wherein the identification data is MIB (Management Information Base) data.

23. The network device management method according to claim 14, wherein the network device, which satisfies previously defined conditions, is a member of each of the plurality of device groups.

24. The network device management method according to claim 14, wherein the type of network device specifies a device on the network.

25. The network device management method according to claim 14, wherein the network device includes a printer.

26. The network device management method according to claim 14, wherein the network device includes a copy machine.

27. A computer-readable storage medium storing a network device management program for monitoring or controlling a network device connected through a network, the management program comprising:

code for an acquisition step of acquiring data related to a network device;

code for a specification step of specifying a type of network device, based on the data acquired in the acquisition step; and code for a group specification step of specifying at least one of a plurality of device groups to which the network device belongs, in a case where the type of network device is not specified in the specification step.

28. The storage medium according to claim 27, wherein the management program further comprises code for a display control step of displaying the data related to the network device on a display unit.

29. The storage medium according to claim 28, wherein, in the display control step, the data related to the network device is displayed in a format for each type of the network device, or in a format for each of the plurality of device groups.

30. The storage medium according to claim 28, wherein in the display control step, a display impossibility is notified, in a case where a device group cannot be specified.

31. The storage medium according to claim 28, wherein the management program further comprises:

code for a first designation step of designating a network device to be monitored; and code for a second designation step of designating a data item related to the network device designated in the first designation step, wherein data for the designated data item related to the designated network device is displayed in the display control step.

32. The storage medium according to claim 31, wherein, in the second designating step, at least one of a state sheet for displaying data related to a state of a network device, a job sheet for displaying information related to a printer queue, a management sheet for displaying manager information, and a network sheet for displaying information related to a network protocol is designated.

33. The storage medium according to claim 27, wherein the management program further comprises code for an identification data acquisition step of acquiring identification data that specifies a type of network device, wherein a type of network device is specified in the specification step based on the identification data.

34. The storage medium according to claim 33, wherein a device group to which the network device belongs is specified in the group specification step based on the identification data.

35. The storage medium according to claim 33, wherein the identification data is MIB (Management Information Base) data.

36. The storage medium according to claim 27, wherein the network device, which satisfies previously defined conditions, is a member of each of the plurality of device groups.

37. The storage medium according to claim 27, wherein the type of network device specifies a device on the network.

38. The storage medium according to claim 27, wherein the network device includes a printer.

39. The storage medium according to claim 27, wherein the network device includes a copy machine.

* * * * *